March 10, 1925. 1,529,570
J. P. BETHKE
MAGNETIC PULLEY
Filed June 10, 1921
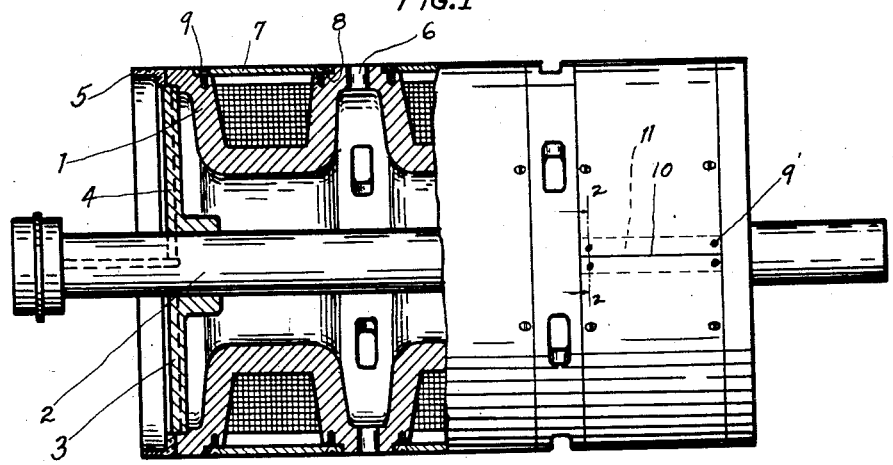
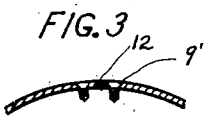
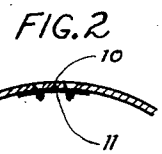
INVENTOR
John P. Bethke
BY
ATTORNEYS Patented Mar. 10, 1925.

1,529,570

UNITED STATES PATENT OFFICE.

JOHN P. BETHKE, OF MILWAUKEE, WISCONSIN, ASSIGNOR TO MAGNETIC SEPARATOR COMPANY, OF MILWAUKEE, WISCONSIN, A CORPORATION OF WISCONSIN.

MAGNETIC PULLEY.

Application filed June 10, 1921. Serial No. 476,638.

*To all whom it may concern:*

Be it known that I, JOHN P. BETHKE, a citizen of the United States, residing at Milwaukee, county of Milwaukee, and State of Wisconsin, have invented new and useful Improvements in Magnetic Pulleys, of which the following is a specification.

This invention relates to magnetic pulleys.

The primary objects of this invention are to provide a magnetic pulley of increased efficiency, that is to say, one in which the total effective flux is very much increased over prior practice; to provide a magnetic pulley which for any given size will have an increased winding space without sacrificing any of the desirable characteristics; and to provide a magnetic pulley in which the flux is more evenly distributed along the periphery of the pulley.

Further objects are to provide a magnetic pulley in which a magnetic band is used in place of the usual brass or bronze non-magnetic bands for bridging the space between the flanges of the spool section; to provide such a protecting band of material of increased strength and toughness whereby a very much thinner band may be used than has hitherto been possible; and to provide a band which may be made of standard material thereby materially reducing the machine work necessary to adapt the band for use upon magnetic pulleys.

Further objects are to provide a magnetic pulley in which slipping of the protecting bands of the windings is prevented; in which positive means are provided for joining the band to the remaining portion of the pulley.

Further objects are to provide a magnetic pulley in which a material reduction of the air gap is effected while increasing the mechanical strength of such pulley, and to provide a magnetic pulley in which a more uniform flux distribution is secured thruout the entire extent of the outer surface of the pulley than has hitherto been possible.

Embodiments of the invention are shown in the accompanying drawings, in which:

Fig. 1 is a side elevation of a magnetic pulley partly in section.

Fig. 2 is a fragmentary sectional view on the line 2—2 of Fig. 1 with parts omitted to more clearly show the construction of the protecting bands at the point of union of its parts.

Fig. 3 is a corresponding view of a further form of protecting band.

The usual practice in constructing magnetic pulleys having spool sections of magnetic material, is to bridge the gap between the adjacent flanges by non-magnetic bands, such for example, as brass in the cheaper forms, and bronze in the more expensive and durable pulleys. It has been found that by this invention a band of rolled steel of materially less thickness than the brass or bronze bands may be substituted for such brass or bronze bands and, in bridging the gap between the adjacent flanges, more uniformly distributes the flux in the space between such flanges.

In the practice of this invention, a magnetic pulley may be employed which has integral, axially aligned spool sections 1 of magnetic material which are carried upon a shaft 2 by means of end members 3, such end members conveniently carrying the conduits or channels 4 for the incoming electrical conductors. The outer ends of the pulleys may be finished by means of a non-magnetic, flanged, annular member 5, if desired. The pulley chosen for illustration is provided with ventilating openings 6 between adjacent flanges of successive spool sections, and the end parts 3 are preferably of open formation, that is to say, comprise a series of radially extending spokes whereby cooling of the interior of the pulley is enhanced.

The protecting bands 7 may conveniently be made of rolled steel of standard shape and are carried in recessed or shouldered portions 8 formed adjacent the outer periphery of the flanges of each spool section. These recesses may be of material width so as to give an effective securing bearing for the outer margins of these bands, the increase in width in no way detracting from the free flow of the magnetic flux as the bands are themselves of magnetic material, there being scarcely any change in reluctance from passing from the cast steel spool sections thru the rolled steel bands. In the former practice, the bronze or brass bands were set in as small a distance as was possible and were held in place solely by friction. In this invention, the steel bands 7 are allowed material bearing contact with the spool sections, and in addition, a series of screws 9 are passed thru the superimposed portions of the bands and into the spool sections to securely position the bands. The ends of each band may be brought into contact with each other and a series of screws 9' may be placed upon each side of the line of division 10 of the band. If desired, a reenforcing or protecting plate 11 of rolled steel, materially thinner than the bands, may be placed beneath this line of union and also may be held by the screws 9', the surfaces of the shouldered or recessed portions being correspondingly notched to receive the plate.

It may be found desirable to omit this reenforcing plate 11, in which case, a construction as illustrated in Fig. 3 may be employed. In this form, the adjacent margins of the band are beveled as indicated at 12 and are drawn into secure contact by means of the screws 9'.

It is to be noted that by using steel bands, a very great reduction in the cost of the pulleys is effected for two main reasons: first, the marked difference in price of standard rolled steel and brass or bronze, and secondly, in the lessening of the machine work necessary for adapting the bands for the pulleys. The machine work in the case of brass or bronze bands must be very accurately done in order to secure the tight fit between the marginal edges of the bands and the corresponding edges of the notched portions as this frictional engagement is the sole means relied on to prevent slipping of the bands in the case of the brass or bronze bands. In the case of the steel bands positive means are provided for joining them to the flange portions of the spool sections and a materially wider bearing surface is provided as there is no diminution in the flux passing outwardly thru these bands as there was in the case of the gap left by the brass bands.

It will also be noted that altho a small portion of the flux leaks across these bands from one flange to the other flange, that a very much greater pull is secured because of the more uniform distribution of the flux effected by these bands of magnetic material. In an actual test, it has been found that a test bar extending along the outer peripheries of magnetic pulleys and conforming to their curvature required a very much greater pull to disengage it from the pulley equipped with bands of magnetic material than was required to disengage it from a pulley of similar construction except that the bands were of brass. It is therefore apparent that more total flux together with a more desirable distribution thereof thruout the entire extent of the pulley is secured by this construction.

In the case of brass bands, the notching of the flanges produced in effect an air gap of high reluctance decreasing the flux passing into the material to be separated. In the present invention, this gap, altho mechanically present, does not have the harmful effect as it is filled by a material of substantially the same reluctance as that of the spool sections. In addition to this, the increased strength and toughness over that of the former material permits of very much thinner bands being used and thereby allows a greater proportion of winding space than was heretofore possible.

It will further be noted that the coefficients of expansion of the brass or bronze bands differed greatly from the coefficient of expansion of the cast steel or cast iron spool portion, so that the binding frictional grip upon the brass or bronze bands varied widely with the temperature changes that the magnetic pulleys are constantly undergoing. This promotes the loosening of the bands causing subsequent slipping and wear. It was often found that the brass or bronze bands had worn so much from this slipping that they could be easily slid along the shouldered portion in the spool sections and consequently did not offer much protection to the winding nor a good grip upon the belt. However, by this invention this trouble is wholly eliminated, as the coefficients of expansion of the cast steel or cast iron, forming the spool section, and the rolled steel, forming the bands, are very nearly equal,— very much nearer the same value than in the case of steel or cast iron and brass. This approximate equality of the coefficients of expansion lessens the danger of the bands opening up in a pulley embodying the present invention. This increase in the inherent grip that these steel bands have may be further aided by the securing means mentioned above.

I claim:

1. A magnetic pulley comprising a main member of magnetic material having a central portion and end flanges, said flanges having widely recessed inner portions adjacent their peripheries, a relatively thin band of magnetic material extending from one flange to the other and seated within the widely recessed portions, fastening means passing through said band and into the flanges adjacent the recessed portions, said fastening means extending radially of the pulley, and an exciting winding positioned upon said main member and beneath said band.

2. A magnetic pulley comprising a main member of magnetic material having a central portion and end flanges integral therewith, said flanges having recessed inner portions adjacent their peripheries; a band of magnetic material extending across from one flange to the other, and seated within the recessed portions; fasteners passing through said band and into the flanges adjacent the recessed portions; and an exciting winding positioned upon said main member and beneath said band.

3. A magnetic pulley comprising a main member of magnetic material having a central portion and end flanges and intermediate annular poles, said flanges and poles having recessed inner portions adjacent their peripheries, relatively thin bands of magnetic material extending between the intermediate poles and between such poles and flanges and seated within the recessed portions, fastening means passing through said bands and into the flanges and intermediate poles, and a plurality of exciting windings upon said pulley and beneath said bands, whereby a plurality of magnetic poles are produced and whereby the flux is distributed between such magnetic poles.

JOHN P. BETHKE.